US008651556B2

(12) United States Patent
Cutting

(10) Patent No.: US 8,651,556 B2
(45) Date of Patent: Feb. 18, 2014

(54) VEHICLE DOOR CHECK LINK MECHANISM

(75) Inventor: Charles Cutting, Taylor, MI (US)

(73) Assignee: Nissan North America, Inc., Franklin, TN (US)

( * ) Notice: Subject to any disclaimer, the term of this patent is extended or adjusted under 35 U.S.C. 154(b) by 98 days.

(21) Appl. No.: 13/017,536

(22) Filed: Jan. 31, 2011

(65) Prior Publication Data

US 2012/0192492 A1 Aug. 2, 2012

(51) Int. Cl.
*B60J 5/00* (2006.01)

(52) U.S. Cl.
USPC .............................. 296/146.12; 16/82; 49/394

(58) Field of Classification Search
USPC ............... 296/146.11, 146.12; 49/394; 16/82; 292/194, 195, 202
See application file for complete search history.

(56) References Cited

U.S. PATENT DOCUMENTS 3,051,983 A 9/1962 Dale
5,727,287 A 3/1998 Hosken et al.
5,862,570 A * 1/1999 Lezuch et al. .................... 16/82
6,438,794 B2 8/2002 Ng et al.
7,739,836 B2 6/2010 Keane et al.
2005/0134084 A1* 6/2005 Rangnekar et al. ....... 296/146.11
2009/0072582 A1* 3/2009 Elliott et al. ............. 296/146.11

FOREIGN PATENT DOCUMENTS

DE 102005007429 A1 8/2006
EP 1033463 A2 9/2000
FR 2721649 A1 12/1995

* cited by examiner

*Primary Examiner* — Glenn Dayoan
*Assistant Examiner* — Melissa A Black
(74) *Attorney, Agent, or Firm* — Global IP Counselors

(57) ABSTRACT

A vehicle door check link mechanism comprises a vehicle mounting member, a vehicle door mounting member, a link member and a latch member. The vehicle mounting member and vehicle door mounting member can be mounted to a vehicle and vehicle door, respectively. The link member can be pivotally coupled to the vehicle mounting member and slidably coupled to the vehicle door mounting member, or vice-versa, to pivot through a pivotal movement range. The latch and link members can prevent the latch member from moving from a latched position that retains the link member to a released position that releases the link member while the link member is disposed within a first pivotal movement range angle, and permit the latch member to move to the released position while the link member is disposed within a second pivotal movement range angle that does not overlap the first pivotal movement range angle.

15 Claims, 14 Drawing Sheets

VEHICLE DOOR CHECK LINK MECHANISM

BACKGROUND

1. Field of the Invention

The present invention generally relates to a vehicle door check link mechanism that limits a door opening amount of a vehicle door to a prescribed door opening angle or amount. More specifically, the present invention relates to a vehicle door check link mechanism that includes a releasable link member so that the vehicle door can be selectively opened past the prescribed door opening angle as needed and/or desired.

2. Background Information

Check link mechanisms are typically used in cooperation with hinges to allow a vehicle door, such as a rear cargo door of a van, to be retained at a predetermined position along a path of door opening movement permitted by the hinge. A typical check link mechanism generally includes a door side mounting portion having a check assembly that slidably engages an arm, and a body side mounting portion containing a release lever that selectively attaches to the distal end of the arm. This type of check assembly can further include a pair of cam followers that are biased together to slide along a channel formed on the upper and lower surfaces of the arm. Thus, the check assembly limits the opening of the vehicle door to an intermediate position. When further opening of the vehicle door is desired, the release lever can be operated to detach the distal end of the arm from the body side mounting portion. When the arm is detached, the hinge allows the vehicle door to rotate to the fully open position.

Although a typical check assembly can limit opening of a vehicle door, the release lever of this type of check assembly can be released at any degree of opening of the vehicle door. Accordingly, if the release lever is released before the vehicle door is open to the intermediate position, the check assembly will not limit opening of the vehicle door to the intermediate position. Rather, the vehicle door may inadvertently swing open beyond the intermediate position. This can result in, for example, damage to the vehicle door hinges if the vehicle door swings open too quickly and overextends the hinges. Also, the vehicle door itself can become damaged by striking an object, such as a wall, pole or other vehicle, that may be located in the path of the vehicle door between the intermediate and fully open positions.

SUMMARY

In view of the state of the known technology, one aspect of the present disclosure is to provide a vehicle door check link mechanism that basically comprises a vehicle mounting member, a vehicle door mounting member, a link member and a latch member. The vehicle mounting member is configured to be mounted to a vehicle. The vehicle door mounting member configured to be mounted to a vehicle door. The link member is pivotally coupled to one of the vehicle mounting member and the vehicle door mounting member to pivot through a pivotal movement range about a pivot axis, and the link member is slidably coupled to the other one of the vehicle mounting member and the vehicle door mounting member. The latch member is operatively coupled between the link member and the one of the vehicle mounting member and the vehicle door mounting member that is pivotally coupled to the link member, and the latch member is movably configured and arranged to move between a latched position that retains the link member and a released position that releases the link member. Also, the latch member and the link member are configured and arranged with respect to each other to prevent the latch member from moving from the latched position to the released position while the link member is disposed within a first prescribed angle of the pivotal movement range and to permit the latch member to move from the latched position to the released position while the link member is disposed within a second prescribed angle of the pivotal movement range. The first and second prescribed angles are non-overlapping angles of the pivotal movement range.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
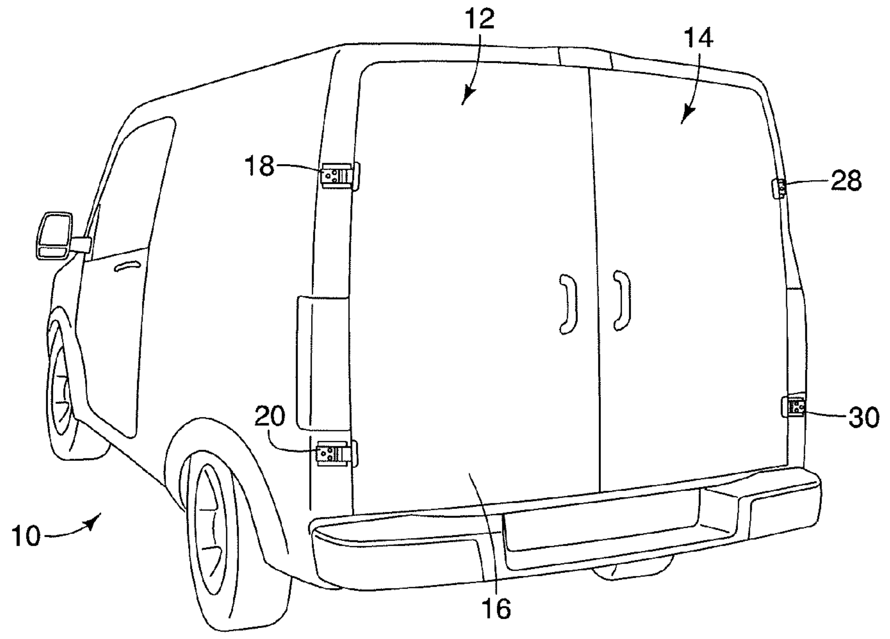
FIG. 1 is a rear perspective view of a vehicle having a pair of vehicle door arrangements with each of the rear doors of the vehicle door arrangements being equipped a vehicle door check link mechanism in accordance with one illustrated embodiment.
Figure 2:
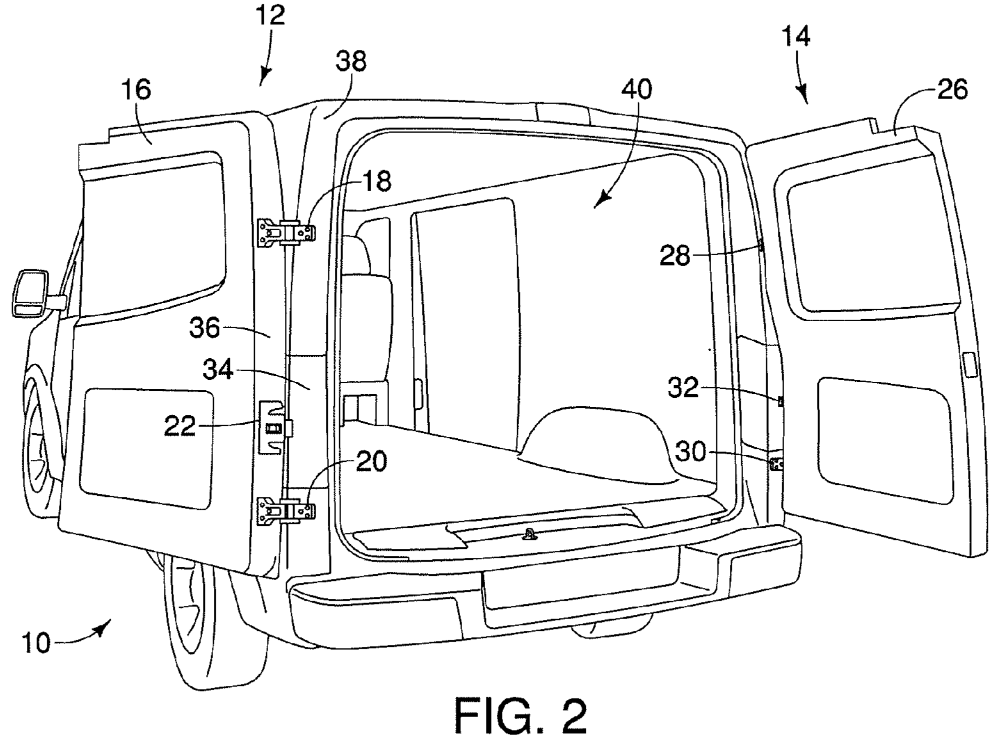
FIG. 2 is a rear perspective view of the vehicle illustrated in FIG. 1 with the vehicle door check link mechanism of the driver's side rear door being in a released position so that the driver's side rear door is opened to a fully opened position and the vehicle door check link mechanism of the passenger's side rear door being in a latched position so that the driver's side rear door is limited from opening past a prescribed door opening angle.
Figure 3:
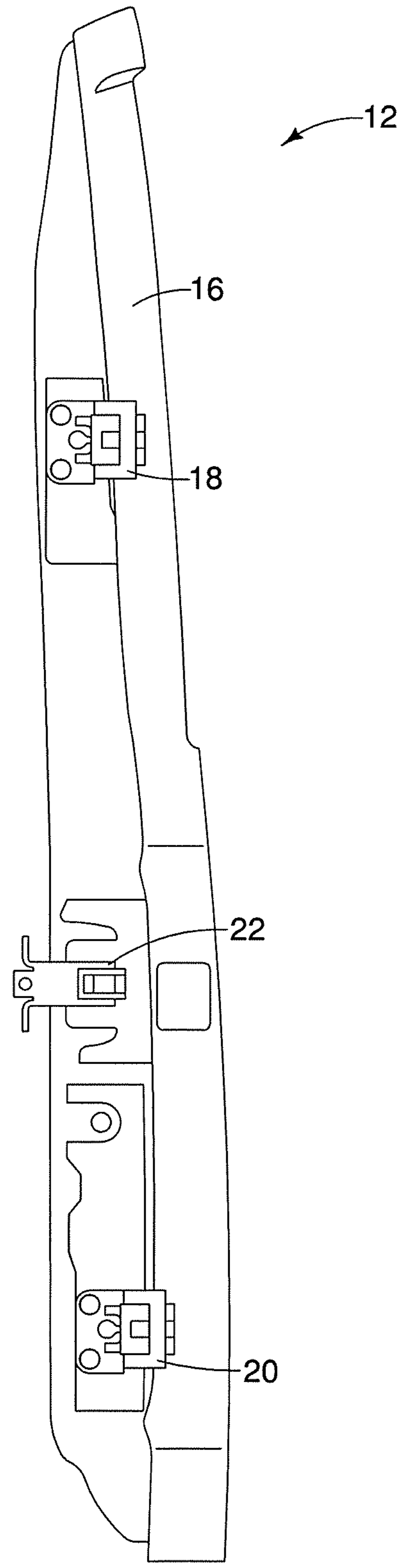
FIG. 3 is an edge elevational view of the driver's side rear door illustrated in FIGS. 1 and 2.
Figure 4:
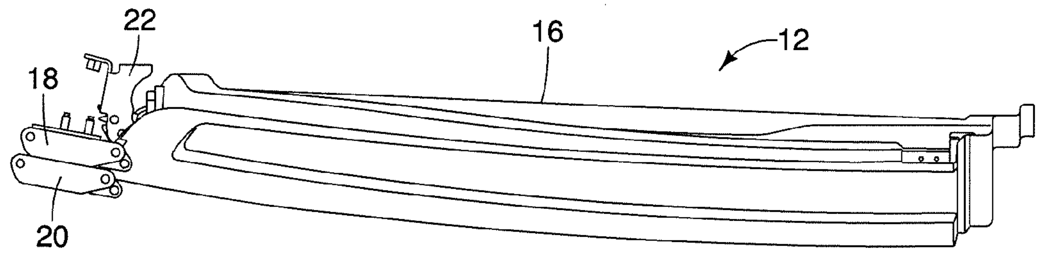
FIG. 4 is a top plan of the vehicle door arrangement for the driver's side rear door illustrated in FIGS. 1 to 3 with the rear door in the closed position.

Referring initially to FIGS. 1 and 2, a vehicle 10 is illustrated having a pair of vehicle door arrangements 12 and 14 in accordance with one illustrated embodiment. In the illustrated embodiment, the vehicle door arrangement 12 includes a rear door 16, an upper hinge 18, a lower hinge 20 and a vehicle door check link mechanism 22. Similarly, the vehicle door arrangement 14 includes a rear door 26, an upper hinge 28, a lower hinge 30 and a vehicle door check link mechanism 32. Since the vehicle door arrangements 12 and 14 are basically mirror images of each other, only the vehicle door arrangement 12 will be discussed in further detail herein. Thus, the following description of the vehicle door arrangement 12 also applies to the vehicle door arrangement 14.

As seen in FIGS. 1 to 4, the vehicle door check link mechanism 22 is disposed between the upper and lower hinges 18 and 20 along a vehicle door jamb 34 of vehicle 10 and a vertical edge 36 of the rear door 16. The upper and lower hinges 18 and 20 are double pivot hinges that provide for the rear door 16 to be opened more than 180° with respect to the vehicle body 38. In other words, the upper and lower hinges 18 and 20 are double pivot hinges that provide for the rear door 16 to be opened more than 180° with respect to a plane that passes through the rear opening 40 perpendicular to the rear end of the vehicle body 38. If the rear door 16 was mounted with a conventional single pivot hinge to the vehicle door jamb 34, the rear door 16 would be limited opening less than 180° because the rear door 16 would contact the vehicle body 38.

As explained below in further detail, the vehicle door check link mechanism 22 is configured to limit movement of the rear door 16 to an intermediate position that corresponds to a prescribed door opening angle. When further movement of the rear door 16 is desired, the vehicle door check link mechanism 22 can be set to a released position such that the hinges 18 and 20 allows the rear door 16 to rotate to a fully open position.

FIGS. 5-8 illustrate and example of the operation of the lower hinge 20 during opening of the rear door 16. Since upper hinge 18, and upper and lower hinges 28 and 30 operate in a similar manner, they will not be discussed in detail.

Figure 5:
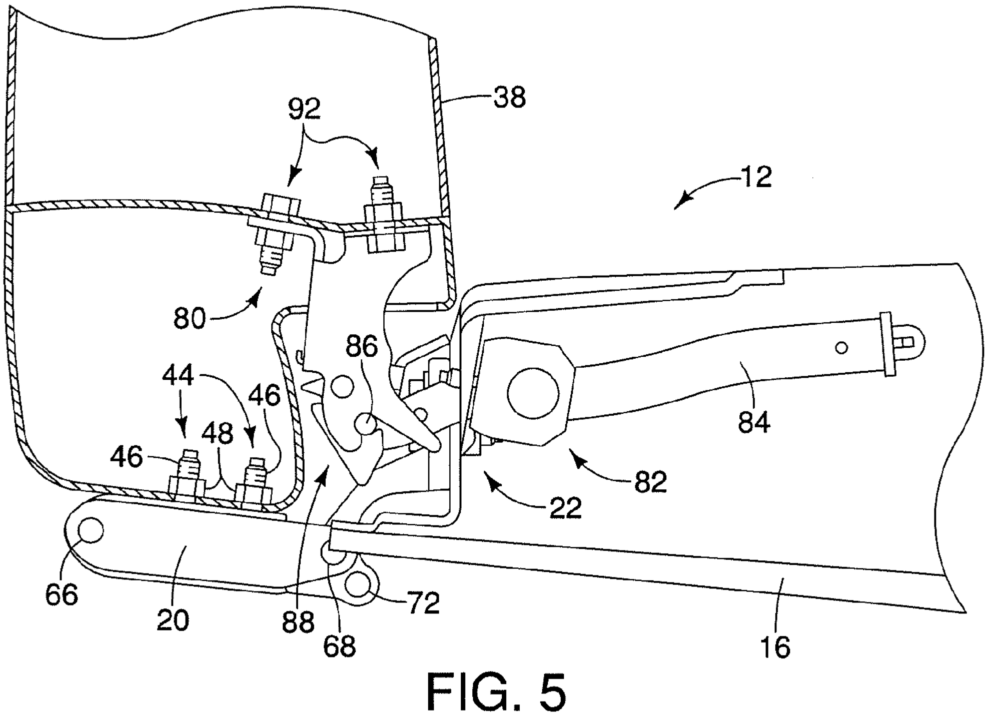
FIG. 5 is a partial cross sectional view of the vehicle door arrangement for the driver's side rear door illustrated in FIGS. 1 to 4 showing the vehicle door check link mechanism while the rear door in the closed position.
Figure 6:
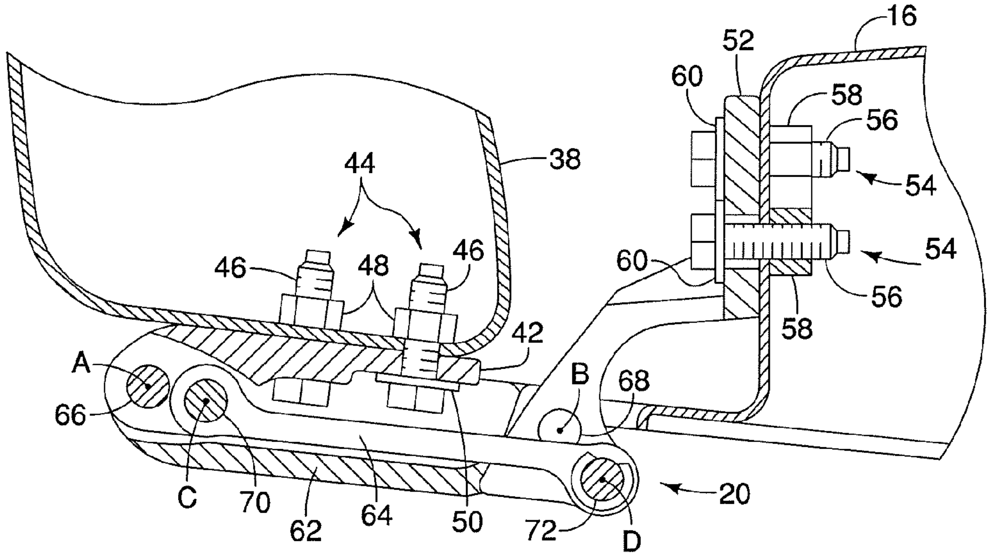
FIG. 6 is a partial cross sectional view of the vehicle door arrangement for the driver's side rear door illustrated in FIGS. 1 to 4 showing the lower hinge of the rear door while the rear door in the closed position.

As seen in FIGS. 5 and 6, the rear door 16 is in a closed position. The lower hinge 20 includes a vehicle mounting bracket 42 that is coupled to the vehicle door jamb 34 by fastening members 44. The fastening members can include a plurality of bolting arrangements that each include, for example, a bolt 46, a nut 48 and at least one washer 50. Each bolt 46 passes through a corresponding opening (not shown) in the vehicle door jamb 34, and the nut 48 secures the bolt 46, and thus the vehicle mounting bracket 42, to the vehicle door jamb 34. Naturally, the vehicle mounting bracket 42 can be secured to the vehicle door jamb 34, or at any other suitable location on the vehicle body 38, by rivets, screws, welds or any other suitable fastener.

The lower hinge 20 further includes a door mounting bracket 52 that is coupled to the rear door 16 by fastening members 54. The fastening members 54 can include a plurality of bolting arrangements that each include, for example, a bolt 56, a nut 58 and at least one washer 60. Each bolt 56 passes through a corresponding opening (not shown) in the vertical edge 36 of the rear door 16, and the nut 58 secures the bolt 56, and thus the door mounting bracket 52, to the vertical edge 36. Naturally, the door mounting bracket 52 can be secured to the vertical edge 36, or at any other suitable location on the rear door 16, by rivets, screws, welds or any other suitable fastener.

The lower hinge 20 also includes a first hinge member 62 and a second hinge member 64. The first hinge member 62 is pivotally coupled to the vehicle mounting bracket 42 at a first pivot point A by a first pivot pin 66. The first hinge member 62 is pivotally coupled to the door mounting bracket 52 at a second pivot point B by a second pivot pin 68. The second hinge member 64 is pivotally coupled to the vehicle mounting bracket 42 at a third pivot point C by a third pivot pin 70. The second hinge member 64 is pivotally coupled to the door mounting bracket 52 at a fourth pivot point D by a fourth pivot pin 72.

Figure 7:
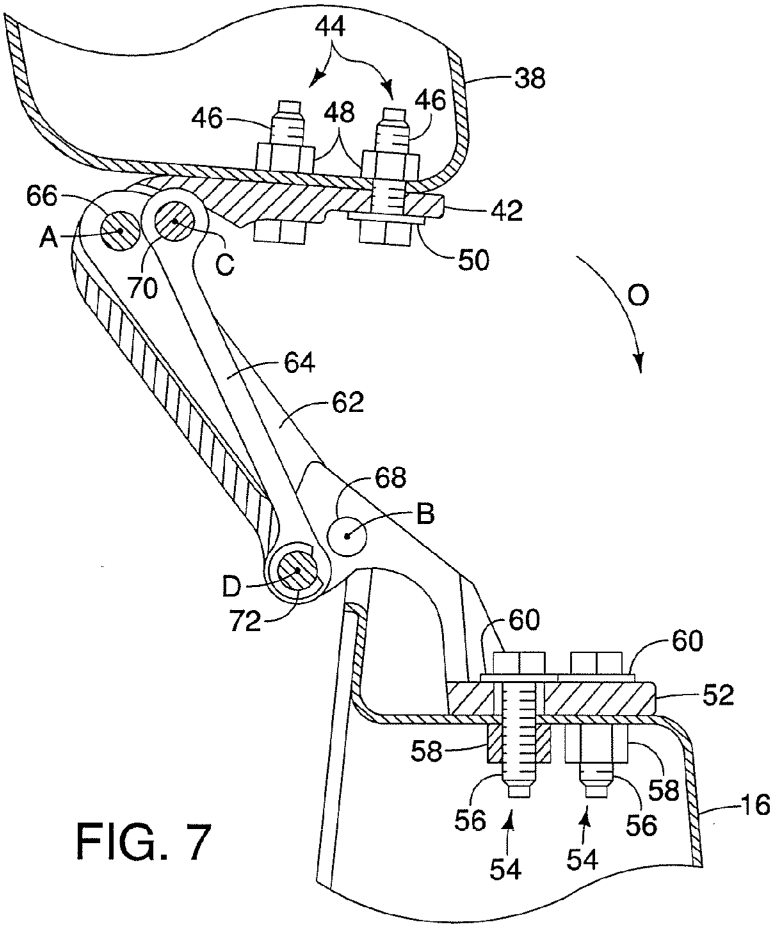
FIG. 7 is a partial cross sectional view of the vehicle door arrangement for the driver's side rear door illustrated in FIGS. 1 to 4 showing the lower hinge of the rear door while the rear door opened to the prescribed door opening angle.

As indicated in FIG. 7, when the rear door 16 is opened in the direction O, the pivoting of the first and second hinge members 62 and 64 about their respective pivot points A-D will cause the rear door 16 to swing out away from the vehicle body 38. That is, the cooperative pivoting of the first and second hinge members 62 and 64 will cause the door mounting bracket 52, and thus the rear door 16, to pivot about pivot axis B. As shown in FIG. 7, the rear door 16 is in a position at or about 90° with respect to the plane that passes through the rear opening 40 perpendicular to the rear end of the vehicle body 38. As discussed in more detail below, the vehicle door check link mechanism 22 prevents the rear door 16 from opening further until the vehicle door check link mechanism 22 is released.

Figure 8:
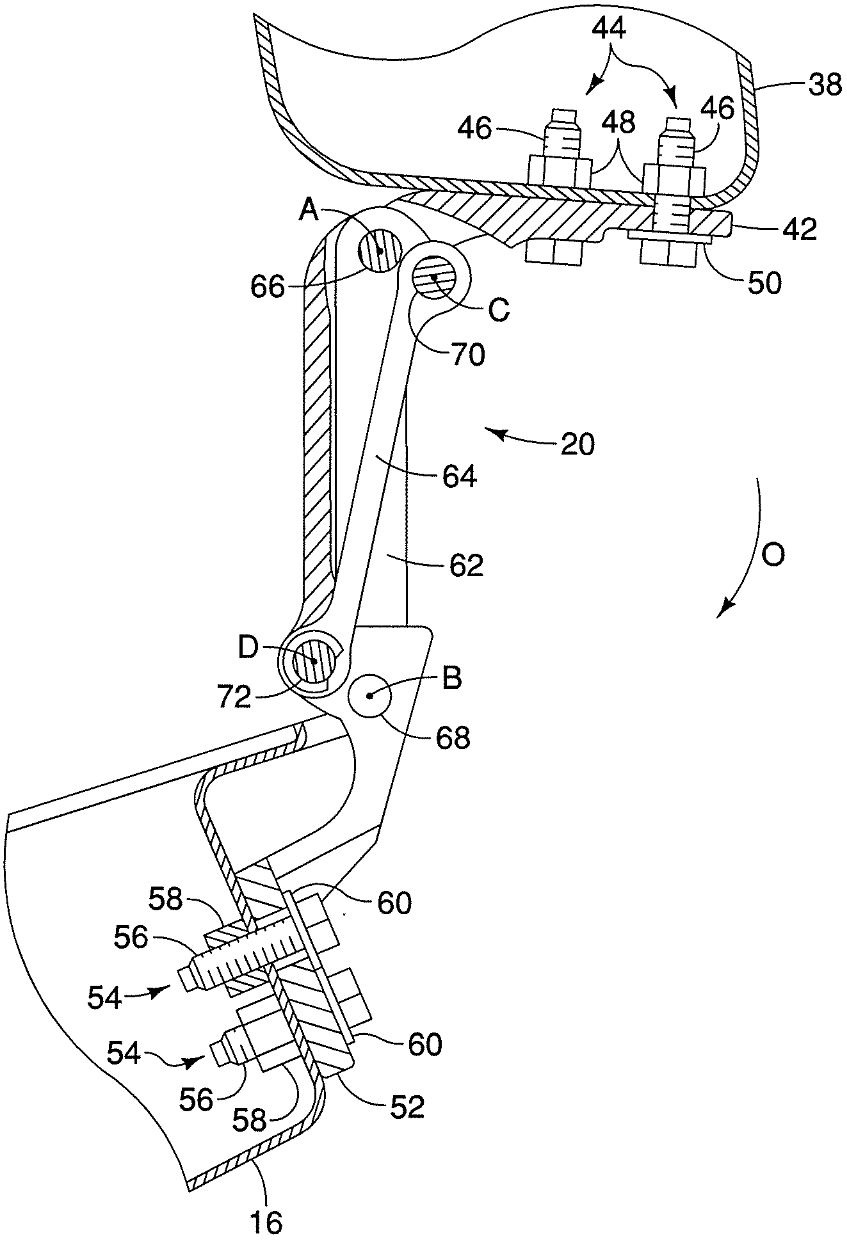
FIG. 8 is a partial cross sectional view of the vehicle door arrangement for the driver's side rear door illustrated in FIGS. 1 to 4 showing the lower hinge of the rear door while the rear door opened past the prescribed door opening angle.

As shown in FIG. 8, when the vehicle door check link mechanism 22 is released and the rear door 16 is further opened in the direction O, the pivoting of the first and second hinge members 62 and 64 about their respective pivot points A-D will cause the door mounting bracket 52, and thus the rear door 16, to further pivot about pivot axis B. As shown in FIG. 8, the rear door 16 is in a position greater than 90° with respect to the plane that passes through the rear opening 40 perpendicular to the rear end of the vehicle body 38. That is, the rear door 16 is in a fully opened position which can be at or about 270°.

Further details of the vehicle door check link mechanism 22 will now be described with regard to FIGS. 5-25.

As seen in FIGS. 5 and 9-25, the vehicle door check link mechanism 22 basically includes a vehicle mounting member 80, a vehicle door mounting member 82, a link arm or member 84, a pivot pin 86 which can also be referred to as a link projection, a latch member 88 and a torsion spring or biasing element 90. The vehicle mounting member 80 is configured to be mounted to the vehicle 10 by fastening members 92. The fastening members 92 can include a plurality of bolting arrangements that each include, for example, a bolt 94 and a nut 96. Each bolt 94 passes through a corresponding opening (not shown) in the vehicle body 38, and the nut 96 secures the bolt 94, and thus the vehicle mounting member 80, to the vehicle body. Naturally, the vehicle mounting member 80 can be secured to the vehicle body 38 by rivets, screws, welds or any other suitable fastener.

The vehicle door mounting member 82 is configured to be mounted to the rear door 16. The vehicle door mounting member 82 can be secured to the rear door 16 by, for example, fastening members 98. In this example, fastening members 98 included threaded posts which are received in corresponding openings (not shown) in the rear door 16. A respective nut (not shown) can be threaded to each of the fastening members 98 to secure the vehicle door mounting member 82 to the rear door 16.

It should also be noted that the structure shown as vehicle mounting member 80 can instead be mounted to the rear door 16 and thus be referred to as a vehicle door mounting member. Likewise, the structure shown as vehicle door mounting member 82 can instead be mounted to the vehicle body 38 and thus be referred to as a vehicle mounting member.

As further illustrated, the link member 84 is pivotally coupled by pivot pin 86 to the vehicle mounting member 80 to pivot through a pivotal movement range about a pivot axis E, and the link member 84 is slidably coupled to the vehicle door mounting member 82. That is, as shown in more detail in FIG. 25, the link member 84 passes through an opening 100 in the vehicle door mounting member 82. A plurality of spring members 102 and 104 apply a force against the upper surface 106 and lower surface 108 of the link member 84 to slidably secure the link member 84 to the vehicle door mounting member 82. The link member 84 is coupled in this manner even if the vehicle mounting member 80 is instead mounted to the rear door 16 and the vehicle door mounting member 82 is instead mounted to the vehicle body 38.

The latch member 88 is operatively coupled between the link member 84 and the vehicle mounting member 80 that is pivotally coupled to the link member 84. The latch member 88 is movably configured and arranged to move between a latched position that retains the link member 84 and a released position that releases the link member 84. That is, the latch member 88 includes a first retaining portion 110 having an upper retaining portion 110A and a lower retaining portion 110B that are substantially identical to each other and define recesses 112A and 112B, respectively. The vehicle mounting member 80 includes a second retaining portion 114 having an upper retaining portion 114A and a lower retaining portion 114B that are substantially identical to each other and define recesses 116A and 116B, respectively. The second retaining portion 114 is cooperatively configured with respect to the first retaining portion 110 to pivotally retain the pivot pin 86 (link projection) to pivotally couple the link member 84 to the vehicle mounting member 80. The latch member 88 is coupled in this manner even if the vehicle mounting member 80 is instead mounted to the rear door 16.

As will now be described in more detail, the latch member 88 and the link member 84 are configured and arranged with respect to each other to prevent the latch member 88 from moving from the latched position to the released position while the link member 84 is disposed within a first prescribed angle of the pivotal movement range, such as below 90°. The latch member 88 and the link member 84 are further configured and arranged with respect to each other to permit the latch member 88 to move from the latched position to the released position while the link member 84 is disposed within a second prescribed angle of the pivotal movement range, such as equal to or greater than 90°. Specifically, in this example, the first and second prescribed angles are non-overlapping angles of the pivotal movement range.

Figure 23:
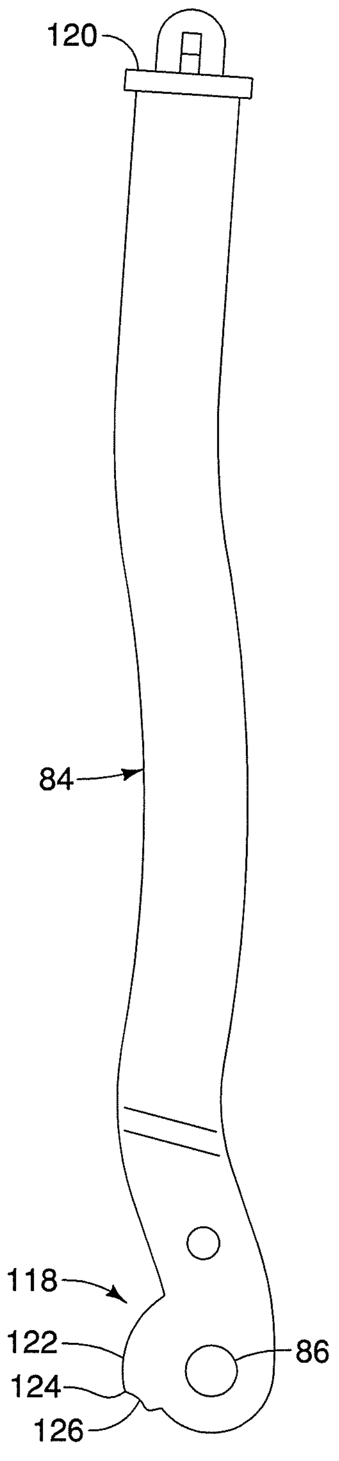
FIG. 23 is a top plan view of the link member of the vehicle door check link mechanism.
Figure 24:
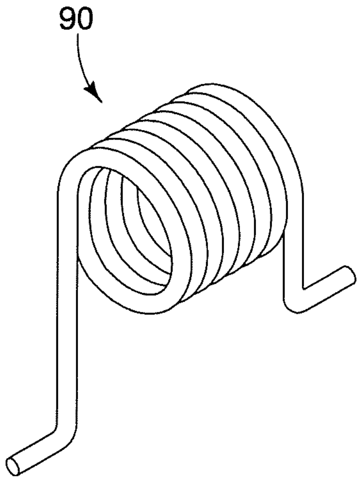
FIG. 24 is a perspective view of the torsion spring of the vehicle door check link mechanism.
Figure 25:
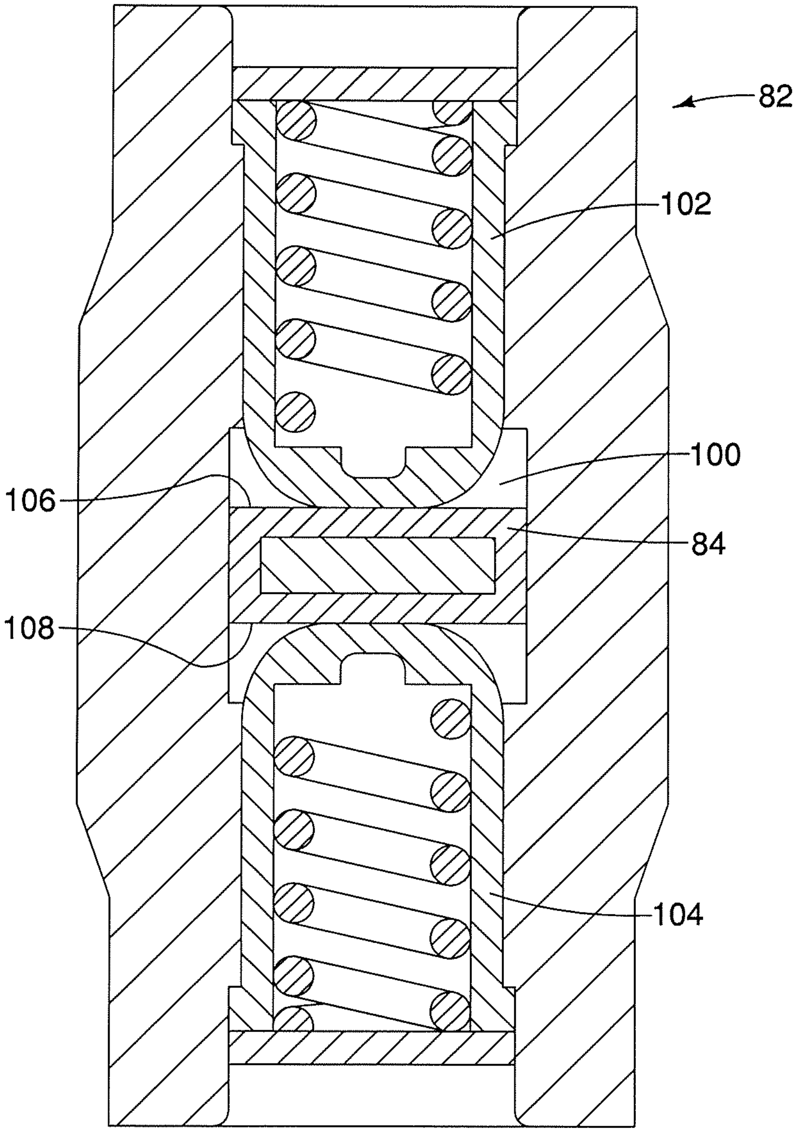
FIG. 25 is a cross sectional view of the vehicle door mounting member of the vehicle door check link mechanism.

As shown in more detail in FIG. 23, the link member 84 includes a pivoting end 118 from which extends the pivot pin 86, and a mounting end having a stopping member 120. The pivoting end defines a curved projection 122 that extends radially with respect to the pivot axis E about which the link member 84 pivots as discussed above. The curved projection 122 also includes a recessed shoulder portion 124 defining a recess 126 as indicated.

Figure 9:
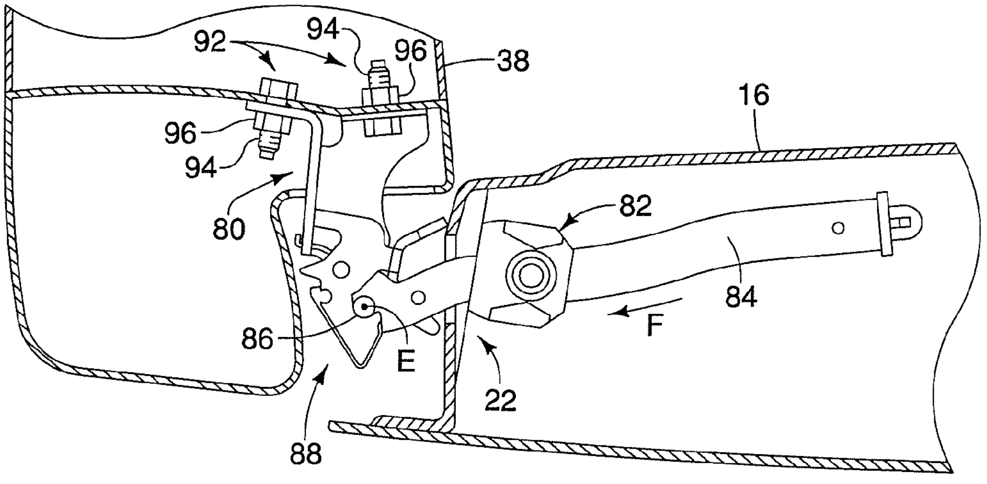
FIG. 9 is a partial cross sectional view of the vehicle door arrangement for the driver's side rear door illustrated in FIGS. 1 to 4 showing the vehicle door check link mechanism while the rear door in the closed position.
Figure 10:
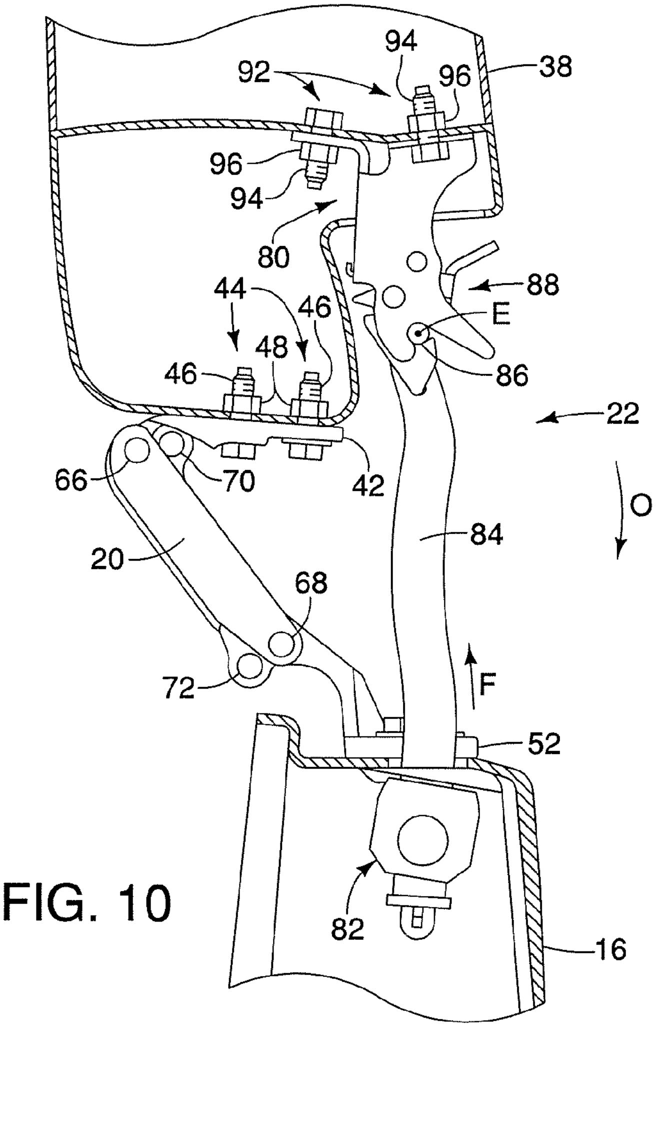
FIG. 10 is a partial cross sectional view of the vehicle door arrangement for the driver's side rear door illustrated in FIGS. 1 to 4 showing the vehicle door check link mechanism while the rear door opened to the prescribed door opening angle.
Figure 12:
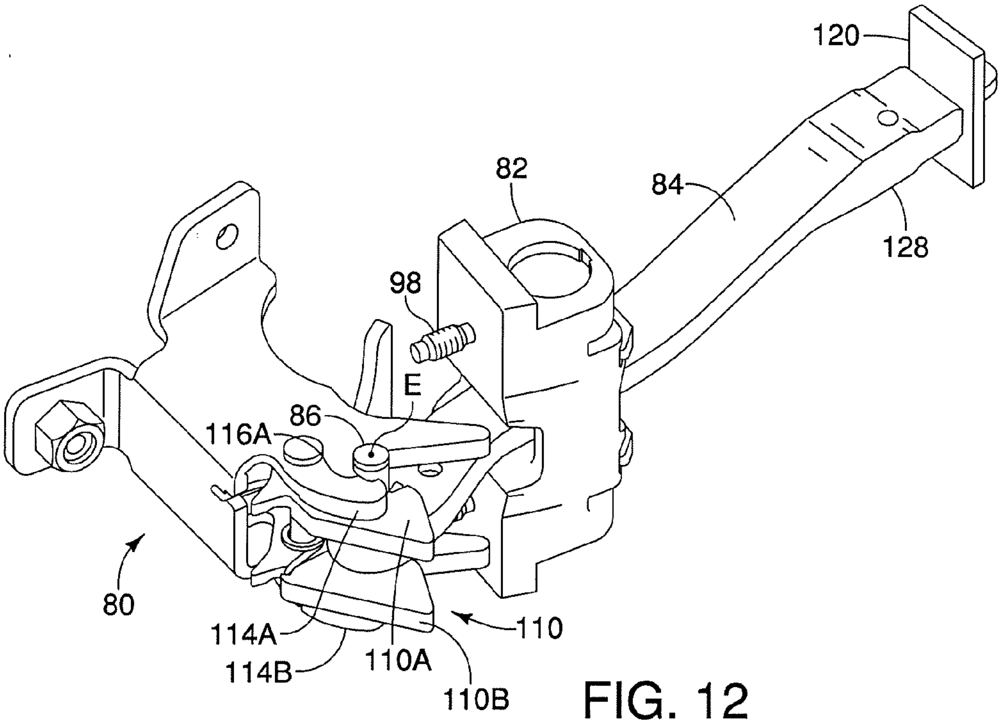
FIG. 12 is a perspective view of the vehicle door check link mechanism in a position corresponding to the rear door being in the closed position.
Figure 13:
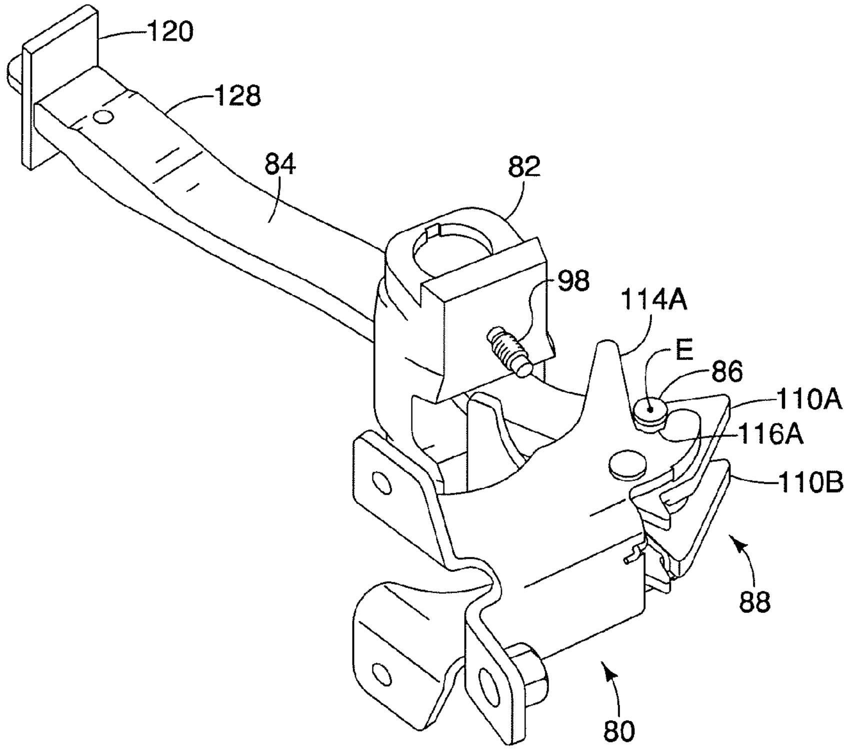
FIG. 13 is another perspective view of the vehicle door check link mechanism in a position corresponding to the rear door being in the closed position.
Figure 14:
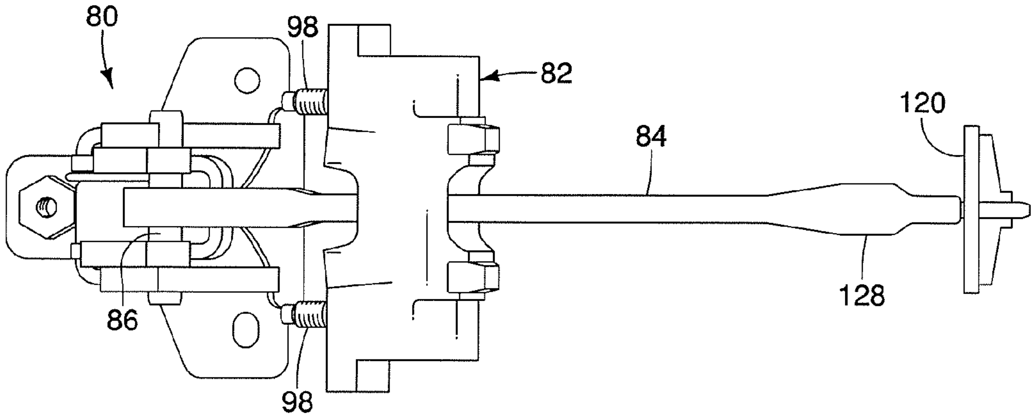
FIG. 14 is a rear elevational view of the vehicle door check link mechanism in a position corresponding to the rear door being in the closed position.
Figure 15:
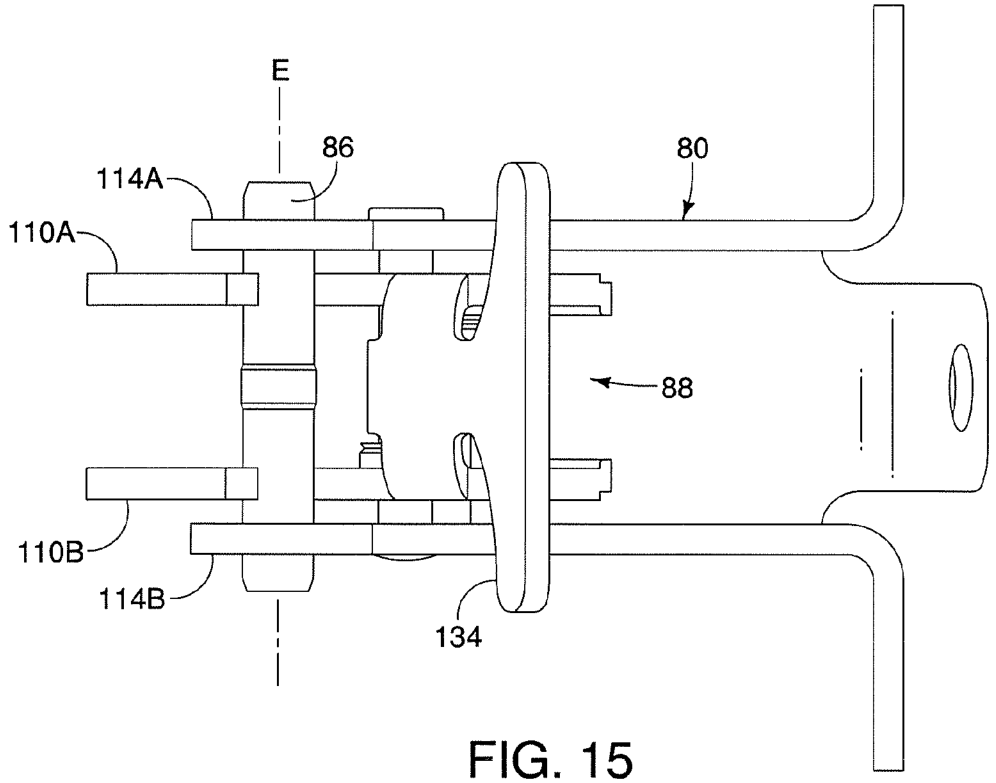
FIG. 15 is an elevational view of selected parts of the vehicle door check link mechanism in a position corresponding to the rear door being in the closed position.

When the rear door 16 is in the fully closed position as shown in FIGS. 5, 6 and 9, the link member 84 and latch member 88 are positioned as indicated. When the rear door 16 is opened in the opening direction O as indicated in FIGS. 7 and 10, the link member 84 will rotation about pivot axis E in the opening direction O, and also slide within vehicle door mounting member 82 in a sliding direction F. As shown in FIGS. 12 and 13, for example, link member 84 includes a thickened area 128. As the thickened area 128 passes between spring members 102 and 104 in the vehicle door mounting member 82, the spring members 102 and 104 apply a force against the upper surface 106 and lower surface 108 of the link member 84 to create friction to slow the movement of the link member 84 in the direction F. The stopping member 120 prevents the link member 84 from exiting opening 100 in the vehicle door mounting member 82 to stop the opening of the rear door 16 at the opening position as shown in FIGS. 7 and 10.

Figure 16:
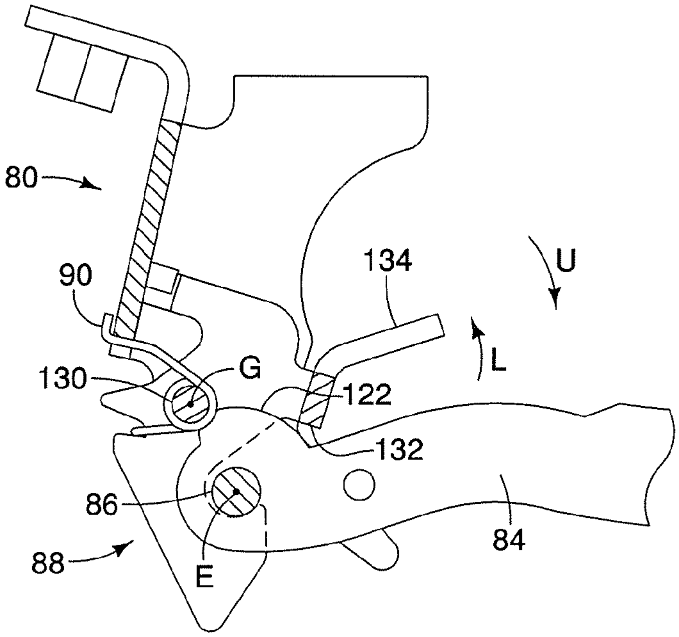
FIG. 16 is a partial cross sectional view of selected parts of the vehicle door check link mechanism in a position corresponding to the rear door being in the closed position.
Figure 17:
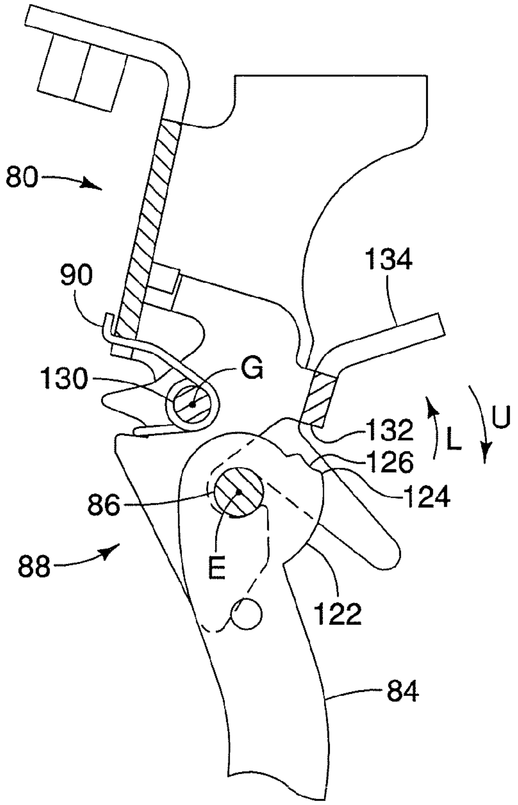
FIG. 17 is a partial cross sectional view of selected parts of the vehicle door check link mechanism in a position corresponding to the rear door being opened to the prescribed door opening angle.
Figure 18:
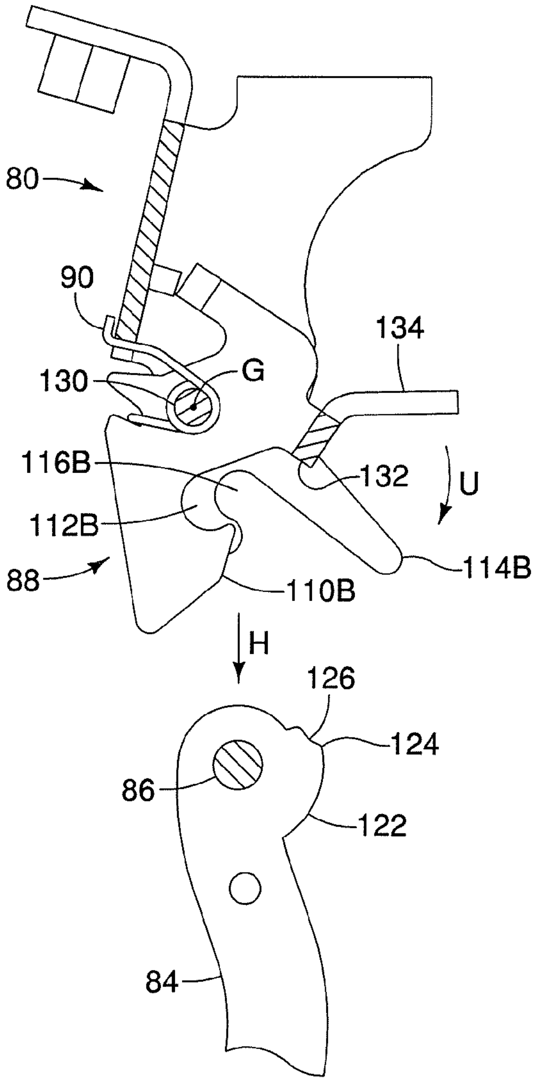
FIG. 18 is a partial cross sectional view of selected parts of the vehicle door check link mechanism in a position corresponding to the link member being released from the vehicle mounting member to permit the rear door to move past the prescribed door opening angle.

As shown in FIGS. 16-19, the biasing element 90 is mounted about a pivot pin 130 that also pivotally mounts the latch member 88 to the vehicle mounting member 80 about a latch pivot axis G. The latch member 88 is thus movably configured and arranged to pivot about the latch pivot axis G between a latched position as shown in FIGS. 16 and 17 to a released position as shown in FIG. 18. The latch member 88 is pivotally coupled at the latch pivot axis G to the vehicle mounting member 80 such that the pivot axis E and the latch pivot axis G are offset from each other. As can further be appreciated from FIGS. 16-19, the pivot axis E and the latch pivot axis G each extend in a direction normal to FIGS. 16-19 (i.e., as represented by point E and G), and are thus parallel to each other. The biasing element 90 biases the latch member 88 is a latching direction L. Accordingly, when the rear door 16 is in the closed position as shown in FIGS. 5, 6 and 9, the link member 84 is disposed in a position as shown in FIG. 16.

In this position, the projection 122 abuts against or blocks a path of movement of an edge 132 of a latch handle portion 134. Thus, the projection 122 blocks a path of movement of the latch member 88 between the latched and released positions while the latch member 88 is in the latched position.

Accordingly, the latch member 88 cannot be rotated in an unlatching direction U that is opposite to the latching direction L to a degree sufficient to enable pivot pin 86 to exit the recesses 116A and 116B in the second retaining portion 114 of the vehicle mounting member 80. Hence, the latch member 84 and the link member 88 are configured and arranged with respect to each other to prevent the first retaining portion 110 from moving away from the second retaining portion 114 to retain the pivot pin 86 (link projection) while the link member 88 is disposed within a first prescribed angle (e.g., less than 90° or any other suitable angle) of the pivotal movement range and to permit the first retaining portion 110 to move away from the second retaining portion 114 to release the pivot pin 86 while the link member 88 is disposed within a second prescribed angle (e.g., equal to or greater than 90° or any other suitable angle that is greater than the first prescribed angle) of the pivotal movement range.

Figure 11:
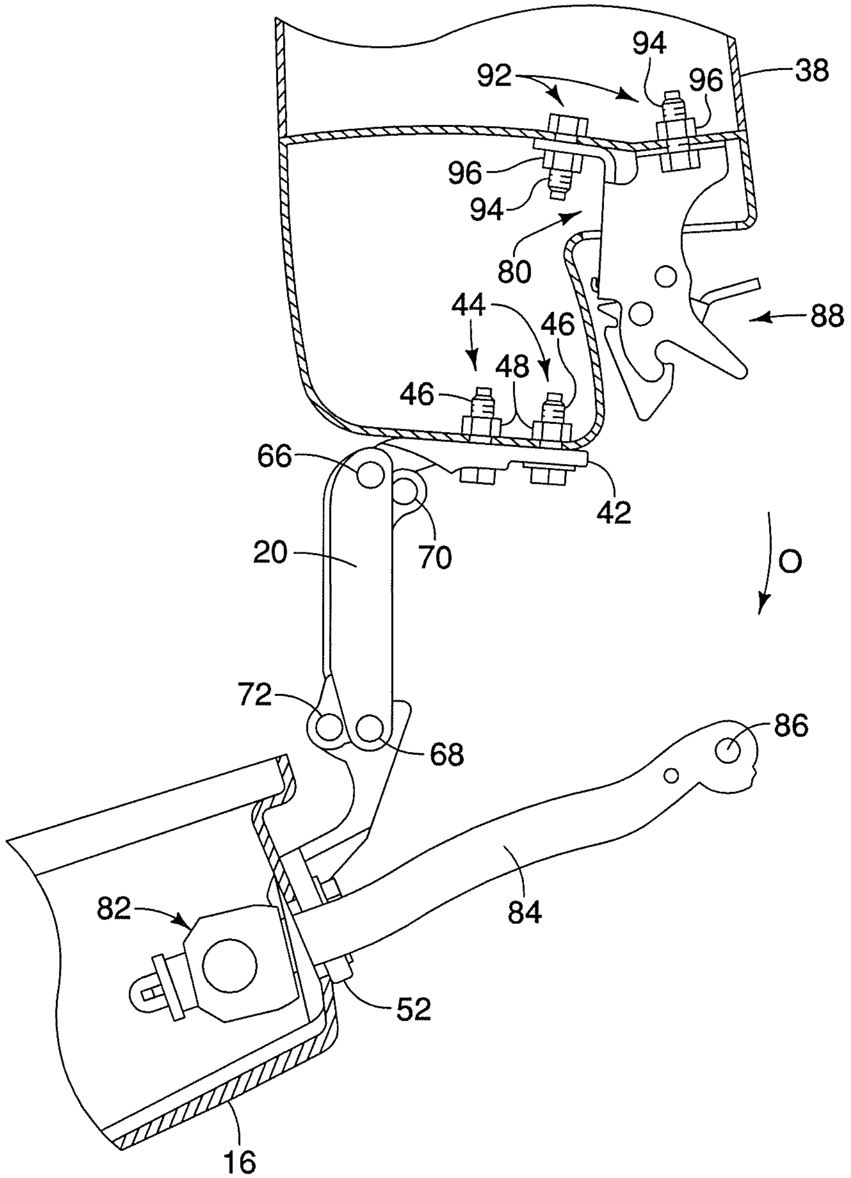
FIG. 11 is a partial cross sectional view of the vehicle door arrangement for the driver's side rear door illustrated in FIGS. 1 to 4 showing the vehicle door check link mechanism while the rear door opened past the prescribed door opening angle.
Figure 19:
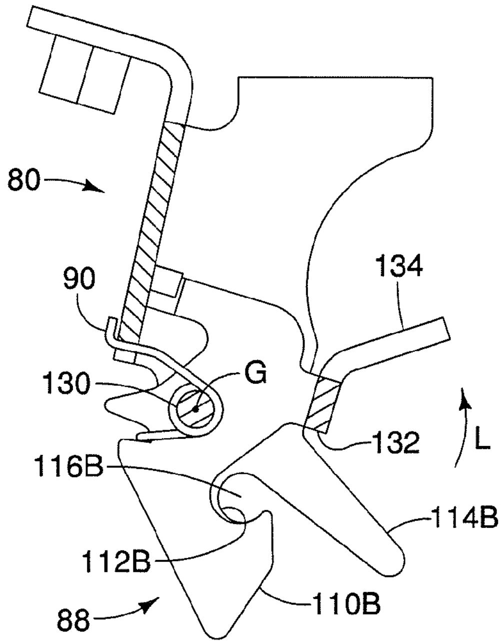
FIG. 19 is a partial cross sectional view of the vehicle mounting member and the latch of the vehicle door check link mechanism in a position after to the link member has been released from the vehicle mounting member.
Figure 20:
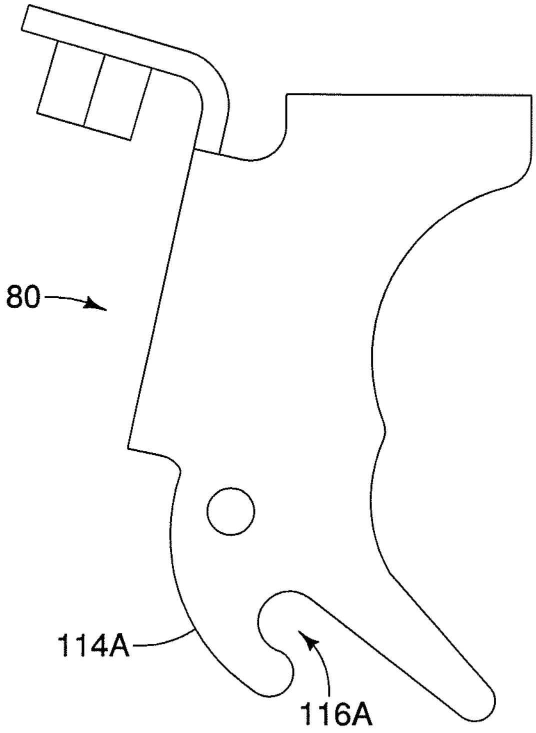
FIG. 20 is a top plan view of the vehicle mounting member of the vehicle door check link mechanism.
Figure 21:
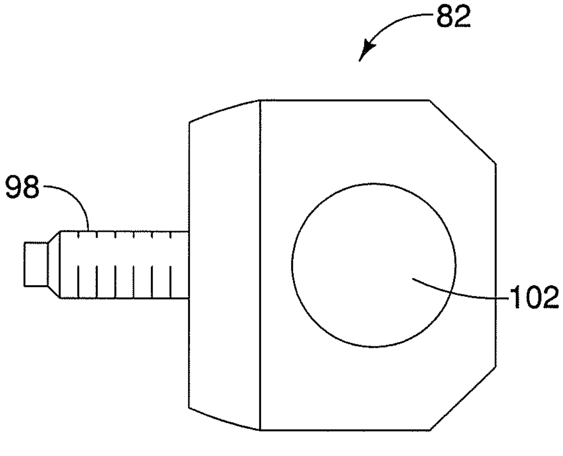
FIG. 21 is a top plan view of the vehicle door mounting member of the vehicle door check link mechanism.
Figure 22:
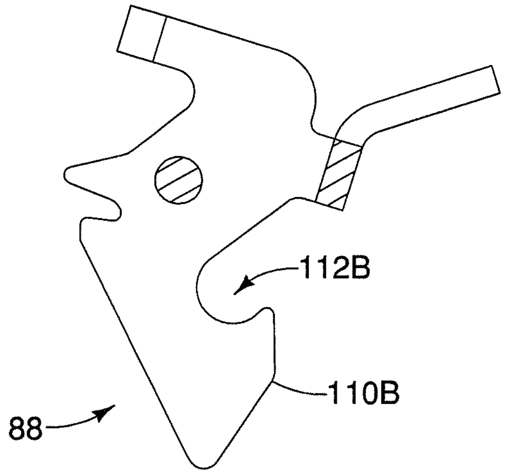
FIG. 22 is a top plan view of the latch of the vehicle door check link mechanism.

However, when the rear door 16 is rotated to an open position as shown in FIGS. 7 and 10, the link member 84 is rotated to within a second prescribed angle (e.g., 90° or greater) as shown in FIG. 17. Accordingly, the projection 122 is disposed outside of the path of movement of the latch member 88 while the link member 84 is disposed within the second prescribed angle to permit the latch member 88 to move in an unlatching direction U from the latched position to the released position. That is, the latch handle portion 134 is configured to enable manual movement of the latch member 88 by, for example, a user from the latched position to the released position while the link member 84 is disposed within the second prescribed angle of the pivotal movement range. When this occurs, the pivot pin 86 can be released to allow the link member 84 to move in a direction H away from the latch member 88 and vehicle mounting member 80. Hence, the rear door 16 can be opened to a fully open position (e.g., at or about 270°) as shown in FIGS. 8 and 11. It should also be noted that once the latch handle portion 134 is released, the biasing member 90 will rotate the latch member 88 back to the latched position as shown in FIG. 19.

As can be appreciated from the above, the vehicle door check link mechanism 22 allows for opening of a vehicle door beyond an intermediate position such as 90° to a fully open position such as 270°. Although the vehicle door check link mechanism 22 is particularly useful for rear cargo doors, the vehicle door check link mechanism 22 can be employed in any type of door that pivotally opens.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the above discussed vehicle door arrangement. Accordingly, these terms, as utilized to describe the present invention should be interpreted relative to a vehicle equipped with the above discussed vehicle door arrangement. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle door check link mechanism comprising:

a vehicle mounting member configured to be mounted to a vehicle;

a vehicle door mounting member configured to be mounted to a vehicle door;

a link member pivotally coupled to the vehicle mounting member to pivot through a pivotal movement range about a pivot axis, and the link member being slidably coupled to the vehicle door mounting member; and a latch member pivotally coupled at a latch pivot axis to the vehicle mounting member such that the pivot axis and the latch pivot axis are offset from each other and parallel to each other, the latch member being movably configured and arranged to move between a latched position that retains the link member and a released position that uncouples the link member from the latch member, the latch member and the link member being configured and arranged with respect to each other to prevent the latch member from moving from the latched position to the released position while the link member is disposed within a first prescribed angle of the pivotal movement range and to permit the latch member to move from the latched position to the released position while the link member is disposed within a second prescribed angle of the pivotal movement range, the first and second prescribed angles being non-overlapping angles of the pivotal movement range.

2. The vehicle door check link mechanism according to claim 1, wherein the link member includes a projection that blocks a path of movement of the latch member between the latched and released positions while the latch member is in the latched position.

3. The vehicle door check link mechanism according to claim 2, wherein the projection is disposed outside of the path of movement of the latch member while the link member is disposed within the second prescribed angle to permit the latch member to move from the latched position to the released position.

4. The vehicle door check link mechanism according to claim 2, wherein the projection extends radially with respect to the pivot axis about which the link member pivots.

5. The vehicle door check link mechanism according to claim 1, wherein the latch member is movably configured and arranged to pivot about the latch pivot axis between the latched position and the released position.

6. The vehicle door check link mechanism according to claim 1, further comprising a biasing member configured to bias the latch member toward the latched position.

7. The vehicle door check link mechanism according to claim 1, wherein the link member includes a link projection;

the latch member includes a first retaining portion; and the vehicle mounting member includes a second retaining portion, cooperatively configured with respect to the first retaining portion to pivotally retain the link projection to pivotally couple the link member to the vehicle mounting member.

8. The vehicle door check link mechanism according to claim 7, wherein the latch member and the link member are configured and arranged with respect to each other to prevent the first retaining portion from moving away from the second retaining portion to retain the link projection while the link member is disposed within the first prescribed angle of the pivotal movement range and to permit the first retaining portion to move away from the second retaining portion to release the link projection while the link member is disposed within the second prescribed angle of the pivotal movement range.

9. The vehicle door check link mechanism according to claim 1, wherein the latch member includes a handle portion configured to enable manual movement of the latch member from the latched position to the released position while the link member is disposed within the second prescribed angle of the pivotal movement range.

10. A vehicle door arrangement comprising:

a vehicle body structure including a vehicle mounting member;

a vehicle door including a vehicle door mounting member;

a vehicle door hinge pivotally coupling the vehicle door to the vehicle body structure from a fully closed position to a fully opened position;

a link member pivotally coupled to the vehicle mounting member to pivot through a pivotal movement range about a pivot axis, such that the link member is releasably coupled between the vehicle mounting member and the vehicle door mounting member to prevent opening of the vehicle door beyond a prescribed door opening angle from the fully closed position while the link member is connected between the vehicle mounting member and the vehicle door mounting member, and to permit opening of the vehicle door beyond the prescribed door opening angle to the fully opened position while the link member is disconnected from the vehicle mounting member; and a latch member pivotally coupled at a latch pivot axis to the vehicle mounting member such that the pivot axis and the latch pivot axis are offset from each other and parallel to each other, the latch member being movably configured and arranged to move between a latched position that retains the link member and a released position that uncouples the link member from the latch member, the latch member and the link member being configured and arranged with respect to each other to prevent the latch member from moving from the latched position to the released position while the link member is disposed less than the prescribed door opening angle and to permit the latch member to move from the latched position to the released position while the link member is disposed at least at the prescribed door opening angle.

11. The vehicle door arrangement according to claim 10, wherein the link member includes a projection that blocks a path of movement of the latch member between the latched and released positions while the link member is disposed less than the prescribed door opening angle.

12. The vehicle arrangement according to claim 11, wherein the projection is disposed outside of the path of movement of the latch member while the link member is disposed at least at the prescribed door opening angle to permit the latch member to move from the latched position to the released position.

13. The vehicle door arrangement according to claim 10, further comprising a biasing member configured to bias the latch member toward the latched position.

14. The vehicle door arrangement according to claim 10, wherein the link member includes a link projection;

the latch member includes a first retaining portion; and the vehicle mounting member includes a second retaining portion, cooperatively configured with respect to the first retaining portion to pivotally retain the link projection to couple the link member to the vehicle mounting member.

15. The vehicle door arrangement according to claim 14, wherein the latch member and the link member are configured and arranged with respect to each other to prevent the first retaining portion from moving away from the second retaining portion to retain the link projection while the link member is disposed less than the prescribed door opening angle and to permit the first retaining portion to move away from the second retaining portion to release the link projection while the link member is disposed at least at the prescribed door opening angle.

* * * * *